United States Patent
Muffatti

(10) Patent No.: US 8,070,063 B2
(45) Date of Patent: Dec. 6, 2011

(54) APPARATUS AND METHOD FOR OBTAINING A RANDOM CODE USEABLE IN A DEVICE FOR UNIQUE IDENTIFICATION OF A PRODUCT

(75) Inventor: Leonardo Muffatti, Montagna di Valtellina (IT)

(73) Assignee: Original Check S.R.L., Milan (IT)

( * ) Notice: Subject to any disclaimer, the term of this patent is extended or adjusted under 35 U.S.C. 154(b) by 0 days.

(21) Appl. No.: 12/717,508

(22) Filed: Mar. 4, 2010

(65) Prior Publication Data

US 2010/0224686 A1    Sep. 9, 2010

(30) Foreign Application Priority Data

Mar. 5, 2009    (IT) .............................. MI2009A0324

(51) Int. Cl.
*G06K 7/04*    (2006.01)
(52) U.S. Cl. ......................... 235/445; 235/444; 235/487
(58) Field of Classification Search .................. 235/444, 235/445, 487, 492
See application file for complete search history.

(56) References Cited

U.S. PATENT DOCUMENTS

| | | | | |
|---|---|---|---|---|
| 5,988,501 A * | 11/1999 | Murakami et al. | ............ | 235/454 |
| 6,176,434 B1 * | 1/2001 | Baldur | ............ | 235/494 |
| 6,193,156 B1 * | 2/2001 | Han et al. | ............ | 235/454 |
| 2005/0006481 A1 * | 1/2005 | Han et al. | ............ | 235/487 |

FOREIGN PATENT DOCUMENTS

| | | |
|---|---|---|
| EP | 0193334 A | 9/1986 |
| GB | 2369078 A | 5/2002 |
| WO | WO 0250790 A1 * | 6/2002 |

\* cited by examiner

*Primary Examiner* — Daniel Hess
*Assistant Examiner* — Matthew Mikels
(74) *Attorney, Agent, or Firm* — Lucas & Mercanti, LLP

(57) ABSTRACT

The present invention refers to a method and to an apparatus for obtaining a random code useable in a device for unique identification of a product wherein the apparatus comprises a sliding path of a continuous strip arranged along which is at least one drilling station for obtaining a plurality of holes on the strip, the plurality of holes forming the random code and it is wherein the drilling station is of the random type generating a plurality of holes according to a random and deterministically irreproducible process.

12 Claims, 7 Drawing Sheets

APPARATUS AND METHOD FOR OBTAINING A RANDOM CODE USEABLE IN A DEVICE FOR UNIQUE IDENTIFICATION OF A PRODUCT

CROSS-REFERENCE TO RELATED APPLICATION

This application claims the benefit of priority from Italian Patent Application No. MI2009A000324, filed Mar. 5, 2009, the contents of which are incorporated herein by reference.

FIELD OF THE INVENTION

The present invention refers to a method and to an apparatus for obtaining a random code useable in a device for unique identification of a product as well as a device obtained by means of the same.

BACKGROUND OF THE INVENTION

It is currently widespread the phenomenon related to selling identical copies of products of particularly renowned trademarks, such as for example clothes and bags, but also high technology products, such as cellular phones, palmtops, laptops, computer accessories and so on.

Such phenomenon has reached greater levels following the growing need of transferring production to suppliers capable of operating at lower costs of labour and thus provide the required products at lower prices.

As a matter of fact, in such manner the suppliers entrusted with production are capable of acquiring complete knowledge regarding the process of producing the ordered products, thus being capable of creating absolutely identical copies to be simultaneously introduced into the market.

Up to date, attempts to end or, at least, reduce such phenomena provide for using particular devices for identifying products that are difficult to reproduce, applied directly on the product or on the labels in turn fixed onto the product.

Currently known for example is the solution of applying to the product silver-coated threads having a magnetic band, or made using labels bearing codes printed in manner that is difficult to counterfeit or identify, such as for example watermarks, holograms, micro-writing, laser codes, or prints using fluorescent ink or comprising pigments sensitive to the light of particular lamps.

The presence and authenticity of the devices for identifying products is thus verifiable by the dealers and by the end purchasers when purchasing goods or even at a later stage, possibly being able to track back to the supplier of the counterfeited goods in case the identification device is not authentic.

The reliability offered by the devices for identifying products is strictly linked to the reproducibility of the same by the counterfeiter.

Should the work required to create an identical copy of such identification device require commitment both in terms of resources and time such to make the copying operation less profitable, a possible counterfeiter would then be strongly discouraged from doing so.

Currently known devices for identifying products are not capable of guaranteeing high degree of reliability over time although they have complex structures that are difficult and expensive to produce.

As a matter of fact, recent technological developments have made it possible, even for small-scale producers, to make—within a reasonable period of time—identical copies of the devices for identifying products currently used, thus depriving such devices of their ability to distinguish and identify the original of a particular product.

Furthermore, the codes made on the currently known identification devices are usually of the serial, progressive and unique type, thus they do not represent efficient solutions against counterfeit.

For example, known are identification devices which comprise a perforated membrane, where the space distribution of the holes obtained on the same defines a code.

In particular, the membranes are perforated defining—ex ante—a random distribution of microholes identifying a code and reproducing such distribution by obtaining microholes on the membrane through a controlled spatial displacement of suitable means for engraving or removing material.

Commonly used as engraving means is the laser which is driven by means of a microprocessor in such a manner to reproduce the shape and positioning of each and every hole.

On the other hand, commonly used as means for removing material are photosensitive masks designed using electronic processing means according to the codes to be reproduced and subsequently used for the selective removal of material by using suitable acids.

Both engraving or removal means known for reproducing holes codes on a membrane are subjected to approximation limits due to the discrete definition of the shape and positioning of the single holes performed by electronic means that drive and make them.

A discrete positioning, just like the discrete shape of the holes provide a finite number, no matter how large it is, of combinations which can thus be calculated and foreseen by means that reproduce the code.

A perforated member thus obtained is thus easily reproducible through electronic detection of the positioning and of the discrete shapes of the holes before driving analogous engraving or removal means in such a manner to reproduce the positions and shapes in an identical manner.

The perforated membrane devices for identifying a product obtained through the currently known apparatus are thus reproducible in an identical manner without the possibility of distinction between an authentic device and a counterfeit device.

SUMMARY OF THE INVENTION

An object of the present invention is that of overcoming the abovementioned drawbacks and in particular that of providing an apparatus and a method for obtaining a random code useable in a device for unique identification of a product capable of obtaining an identification device not reproducible identically.

Another object of the present invention is that of providing an apparatus and a method for obtaining a random code useable in a device for unique identification of a product having a non-identically reproducible code.

Last but not least, an object of the present invention is that of obtaining a random code useable in a device for unique identification of a product which, though offering high degree of reliability, may be obtained in a simple manner.

These and other objects according to the present invention are attained by providing an apparatus and a method for obtaining a random code useable in a device for unique identification of a product as outlined in the independent claims.

Further characteristics of the apparatus and method for obtaining a random code useable in a device for unique identification of a product are subject of the dependent claims.

BRIEF DESCRIPTION OF THE DRAWINGS

Characteristics and advantages of an apparatus and a method for obtaining a random code useable in a device for unique identification of a product according to the present invention shall be clearer from the following exemplifying and non-limiting description, referring to the attached schematic drawings wherein:

FIG. 8a is a plan view of a first particular embodiment of the device for unique identification of a product of FIG. 7a; and FIG. 8b is a plan view of a second particular embodiment of the device for unique identification of a product of FIG. 7a.

DETAILED DESCRIPTION OF THE INVENTION

Figure 1:
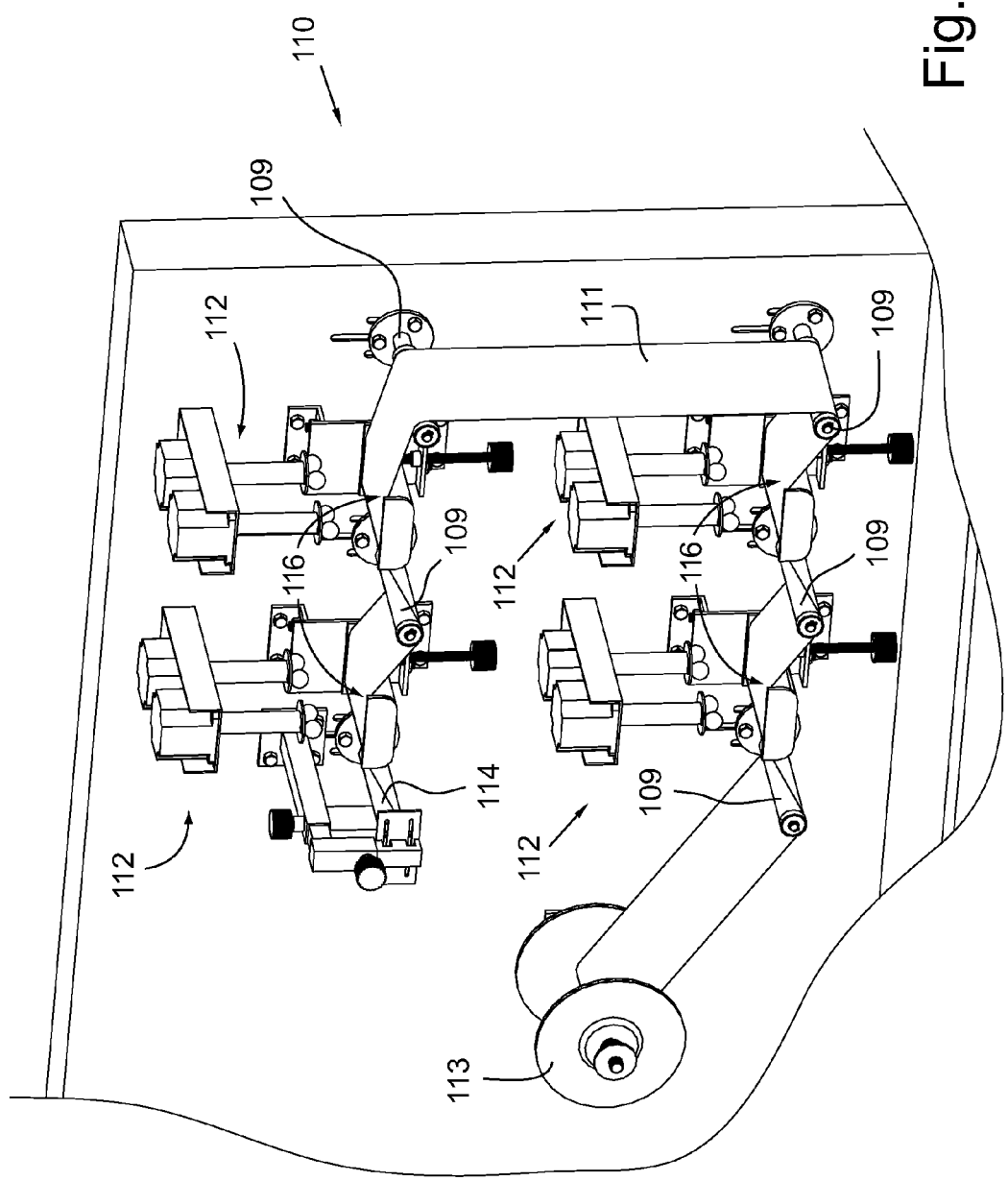
FIG. 1 is a perspective view of a first preferred embodiment of the apparatus for obtaining a random code useable in a device for unique identification of a product according to the present invention.

Referring to the figures, shown is an apparatus for obtaining a random code useable in a device 10 for unique identification of a product, indicated in its entirety with 110.

The apparatus 110 comprises a sliding path of a continuous strip 111, preferably made of polymer material, arranged along which is at least one drilling station 112 for obtaining a plurality of holes on the strip 111.

In particular, the sliding path may be delimited by a first roller 113 for unwinding the continuous strip 111 and a second roller 114 for winding such strip 111 once perforated. Furthermore, the sliding path may comprise a plurality of deviation and tensioning rollers 109 suitable to impose a determined path to the continuous strip 111.

Advantageously, the drilling station 112 is of the random type i.e. it is capable of generating a plurality of holes according to a random and irreproducible process.

Figure 2:
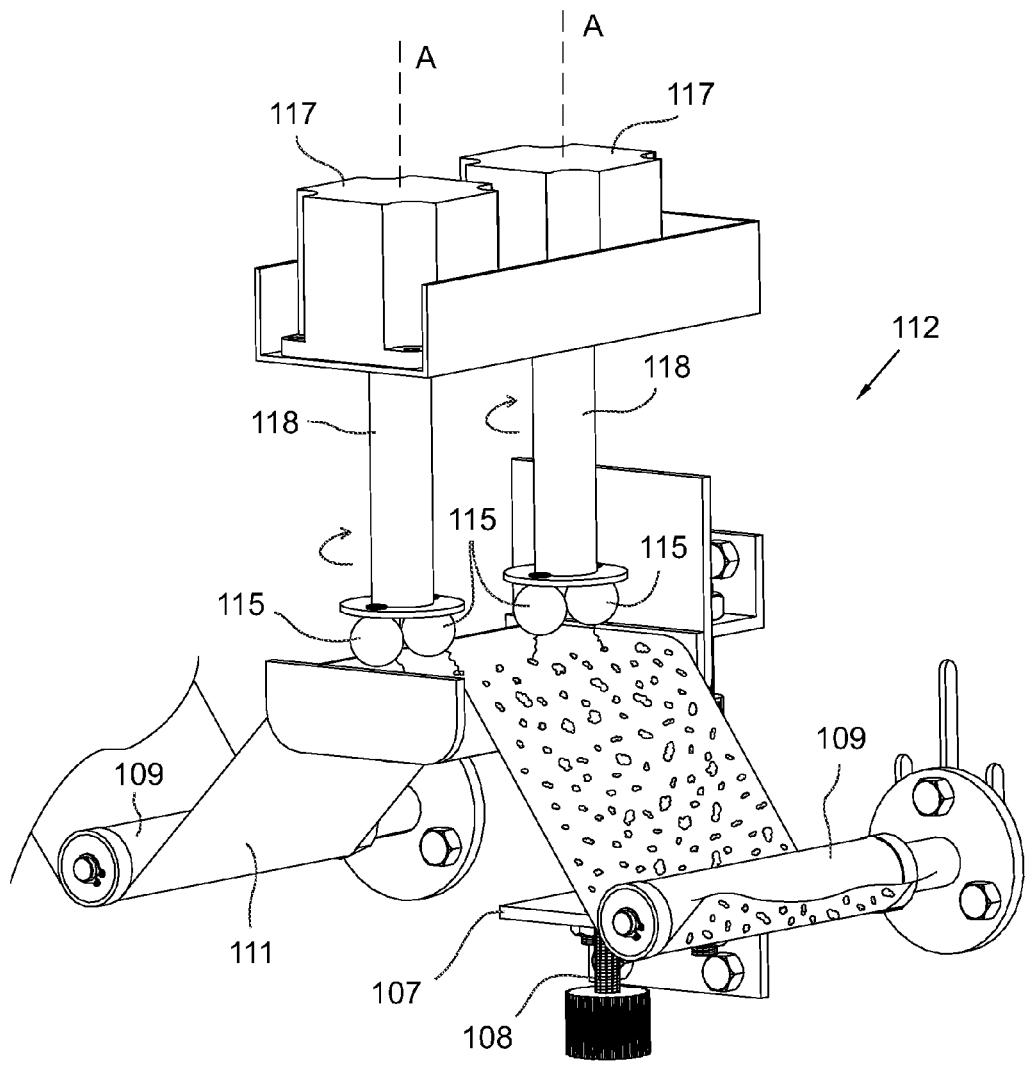
FIG. 2 is a view of an enlarged detail of the apparatus for obtaining a random code useable in a device for unique identification of a product of FIG. 1 during operation.

According to a first preferred embodiment illustrated in FIGS. 1 and 2, the random drilling station 112 comprises at least one means 115,117,118 for generating an electrical discharge towards the continuous strip 111 passing by.

Each electrical discharge makes a hole in the continuous strip 111, the hole generally measuring between 0.5 mm and 2 mm, distributed randomly and of any shape and generally irregular.

The distribution is entirely random being linked to the random and irreproducible process of the ionisation of the molecules in the air for defining a discharge trajectory.

The discharge paths that are created are thus always different and deterministically non-reproducible, i.e. through discrete processes, for example implemented through numerical control machines.

In such a manner, even the shape of the hole thus obtained is entirely random depending, among other factors, on the angle of incidence of the electrical discharge and thus on the random discharge path.

In the embodiment illustrated in FIGS. 1 and 2, the at least one means 115,117,118 for generating an electrical discharge comprises at least one sphere made of material having good electrical conduction 115 properties, for example metal, supported suspended and facing a metal support 116 substantially flat, sliding on which is the continuous strip 111.

Applied between the metal sphere 115 and the flat support 116 is a potential difference sufficient for generating electrical discharges between the two elements 115,116.

In particular, the flat support 116 is connected to the earth, while the metal sphere 115 is connected to a source of voltage through a driving circuit 106 suitable to impart to the metal sphere 15 a voltage wave with peak values sufficient to generate electrical discharges.

Preferably, the voltage wave is made up of linear rising and falling fronts with peak values comprised between 8 kV and 25 kV and a frequency such to generate 20-40 discharges per second.

Figure 3:
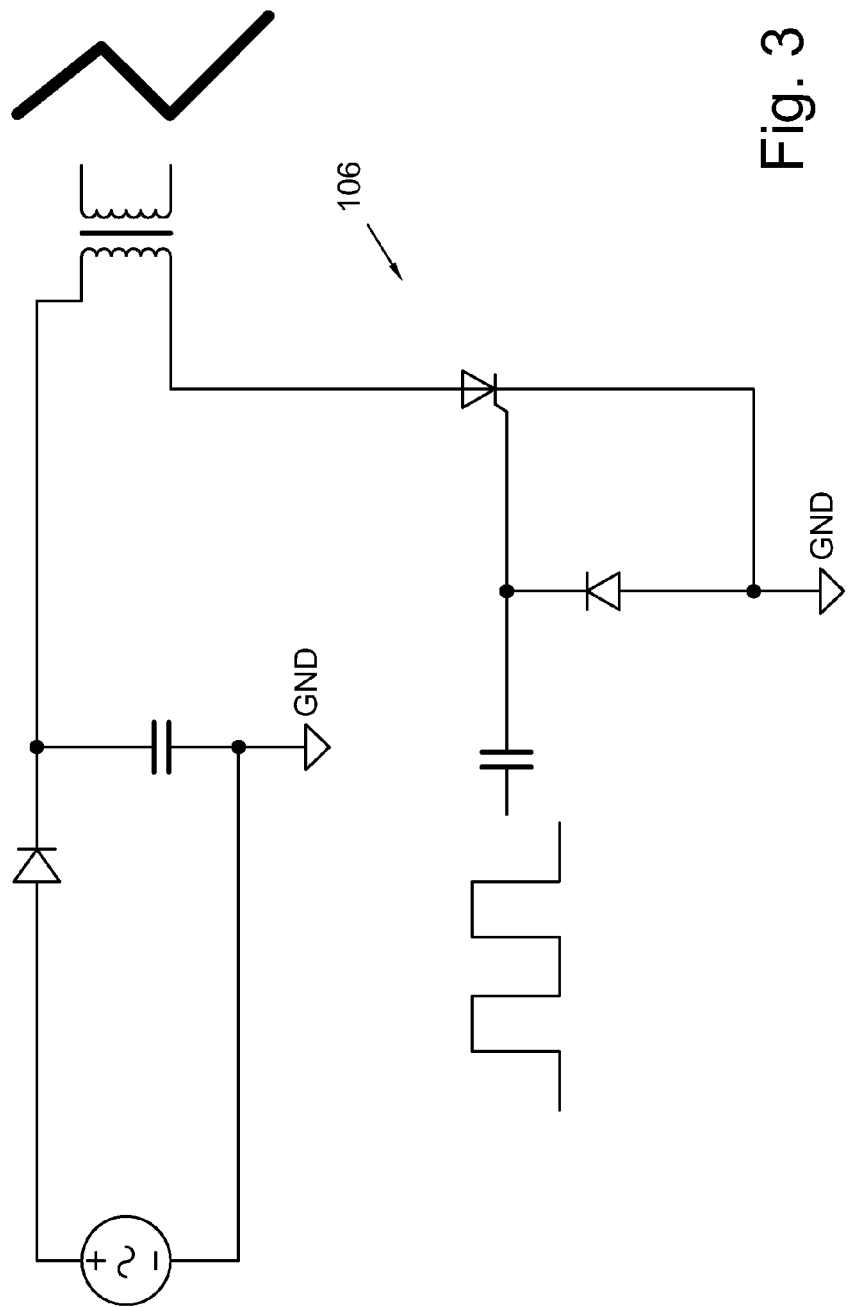
FIG. 3 is a circuit diagram of an embodiment of the driving circuit useable in the apparatus of FIG. 1.

An example of a driving circuit 106 is illustrated in FIG. 3.

The flat support 116 is preferably adjustable moving away from and nearing towards at least one metal sphere 115 with the aim of adjusting to the available peak value.

For example, provided for such purpose is an adjustment screw 108 coupled rotatingly to a fixed element 107 and to the flat support 116 in such a manner to translate with respect to the fixed element 107 and impart a vertical translation to the flat support 116 when actuated in rotation.

Preferably, at least one metal sphere 115 is moveable on a plane parallel to the flat support 116 with the aim of distributing electrical discharges along the movement path thereof.

For such purpose, the metal sphere 115 is for example supported rotatingly around a rotation axis A by a connection rod 118, preferably coated with insulating material, and driven in rotation by means of an actuator 117.

In the embodiment illustrated in FIGS. 1 and 2, the at least one means 115,117,118 for generating an electrical discharge of the drilling station 112 advantageously comprises at least one pair of metal spheres 115 rotatingly supported by the same connection rod 118 through an interface plate 119.

The combined movement of advancement of the continuous strip 111 and rotation of the metal spheres 115 allows creating holes on a large portion of the continuous strip 111 with an entirely random distribution.

In order to simultaneously machine the wider continuous strips it is advantageous to adjacently provide one or more means 115,117,118 for generating an electrical discharge.

Furthermore, in order to increase the density of holes, it is advantageous to provide for a plurality of successive random drilling stations 112, as shown in the embodiment of FIGS. 1 and 2.

Preferably, provided for along the sliding path of the continuous strip 111, downstream of the at least one random drilling station 112, is a sensor for detecting the created holes (not illustrated).

The sensor provides to a driving unit (not illustrated) data regarding the distribution of generated holes, according to which the advancement speed of the strip 111, the rotation speed profile of the metal spheres 115, the frequency of the voltage wave imparted to the sphere 115, as well as the activation of a given number of drilling stations 112 are set.

Figure 4:
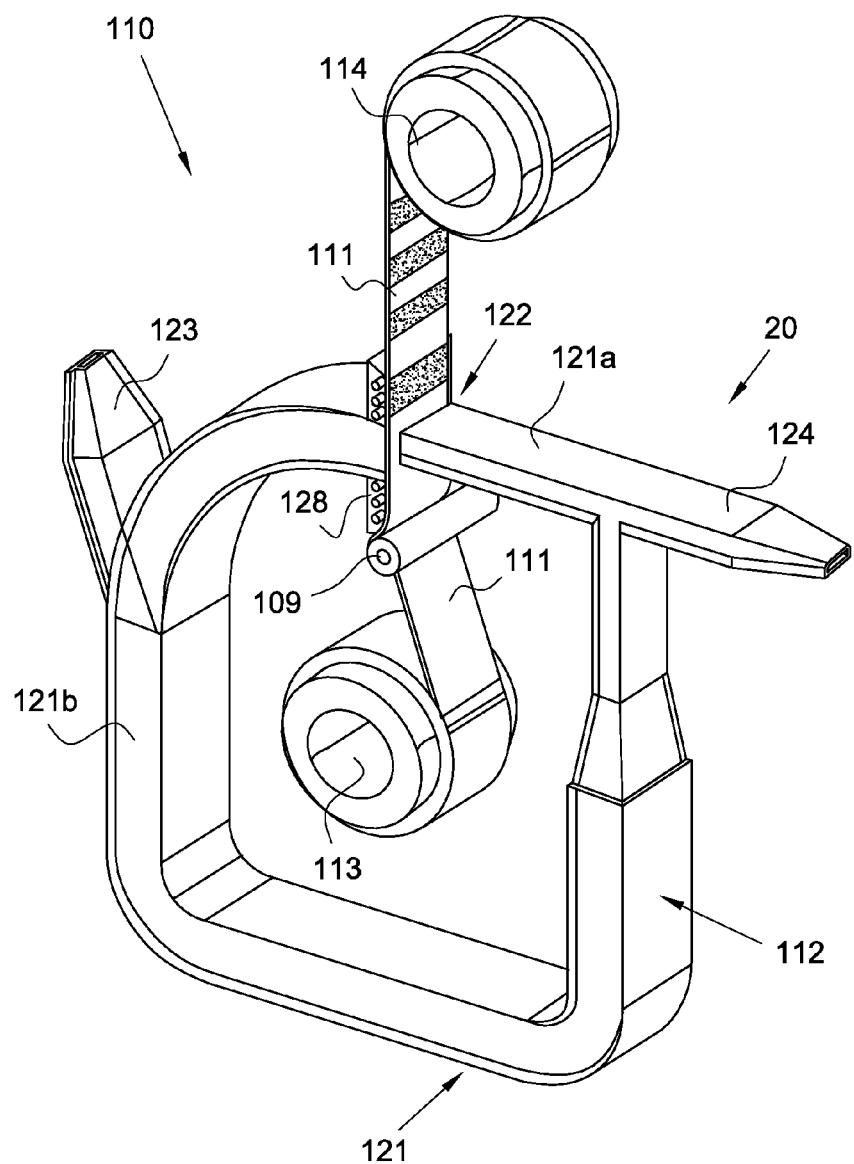
FIG. 4 is a perspective view of a second preferred embodiment of the apparatus for obtaining a random code useable in a device for unique identification of a product according to the present invention.

In a second embodiment illustrated in FIG. 4, the random drilling station 112 comprises an annular duct 121 free to move inside which is a plurality of particles.

The annular duct 121 has an air gap 122 whose size substantially corresponds to the thickness of the continuous strip 111 to be perforated, wherein the term air gap 122 is used to indicate a slot for interrupting the annular duct 121.

Furthermore, the annular duct 121 is provided with two nozzles 123, 124 for introducing compressed air: a first nozzle 123 is arranged downstream of the air gap 122 with respect to the direction of motion of the particles and it is inclined in such a manner to facilitate the motion of the particles moving away from the air gap 122, and a second nozzle 124 is arranged upstream of the air gap 122 with respect to the direction of motion of the particles and inclined in such a manner to push particles towards the air gap 122 through the flow of the introduced air.

Perforation occurs through the introduction of a compressed air flow with specific pressure and temperature values through the first 123 and second nozzle 124.

In the case of the first nozzle 123, for example, it is possible to provide for an air flow having pressure equivalent to 5 bars and temperature equivalent to 150° C.

In such a manner, the particles are pushed away from the first nozzle 123 towards a zone upstream of the air gap 122 creating a chaotic motion in proximity to the same, promoting the randomness of the positioning shape of the holes, also deriving from the impact of the particles with the walls of the pipe 121.

Due to the compressed air insufflated through the first nozzle 123, there also occurs a slight depression between the zone downstream of the air gap 122 and the first nozzle 123 which sucks the particles remaining in such zone moving them to the first nozzle 123 where they shall be pushed towards the zone upstream of the air gap 122 by the flow of insufflated air.

Once in proximity to the zone upstream of the air gap 122, the particles are violently shot towards the same 122 and thus towards the strip 111 through a discontinuous flow of high temperature and high pressure compressed air, for example a pressure of 10 bars and a temperature of 150° C., insufflated through the second nozzle 124.

In such a manner, the particles perforate the strip 111—at random points—creating on the same a random distribution of holes shaped depending on the instantaneous and entirely random agglomerations of particles, as well as on the direction of engraving of the same.

The distribution and agglomerations are entirely random being linked to the random and irreproducible process for defining a shooting trajectory of the particles against the strip 111 due to the chaotic motion that the same have.

The discontinuity of the airflow, alongside the continuity of motion of the two rollers 113, 114, creates perforated bands on the strip 111.

Preferably, the annular duct 121 is substantially square or rectangular shaped with an air gap 122 arranged at the upper side 121a of the square or rectangle.

In such configuration, the first nozzle 123 is arranged at the vertical side 121b downstream of the air gap 122 and it is preferably directed downwards. The second nozzle 124 instead represents an extension of the upper side 121a and it is arranged upstream of the air gap 122.

On one hand, the air gap 122 is also provided with a surface 128, which is preferably heated to facilitate the perforation of the strip 111, and arranged transverse with respect to the annular duct 121 suitable to create a contrast wall for the strip 111 and hence prevent the strip 111 from projecting from the extended configuration thereof.

Figure 5:
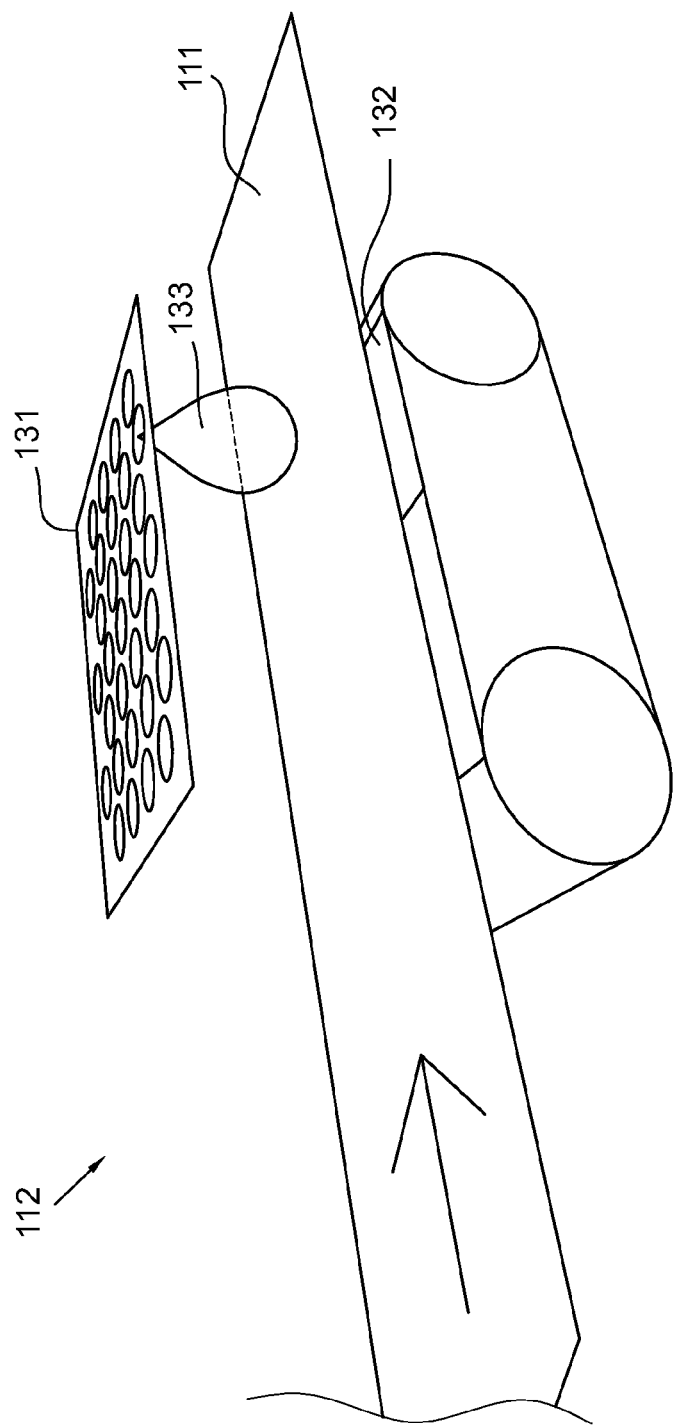
FIGS. 5 and 6 are perspective views of a third and a fourth preferred embodiment of the apparatus respectively for obtaining a random code useable in a device for unique identification of a product according to the present invention.

In a third embodiment illustrated in FIG. 5, the random drilling station 112 comprises a pattern of nozzles 131, with variable opening, for the pouring of a corrosive agent supplied at the upper part of the same 131, where the pattern of nozzles 131 is supported suspended and facing a substantially flat support 132 sliding on which is the continuous strip 111.

Through the supply of the corrosive agent and the formation of free falling drops 133 there occurs a random distribution of drops of corrosive agent on the continuous strip 111 each generating a hole.

The distribution and shape of the holes is entirely random being linked to the random and irreproducible process for defining the falling trajectories of the drops of corrosive agent.

The drops thus always end up lying in different and deterministically non-reproducible positions.

Furthermore, even the shape of the hole thus obtained is entirely random depending, among other factors, on the random agglomeration of several drops and on the corrosive action of the agent.

Figure 6:
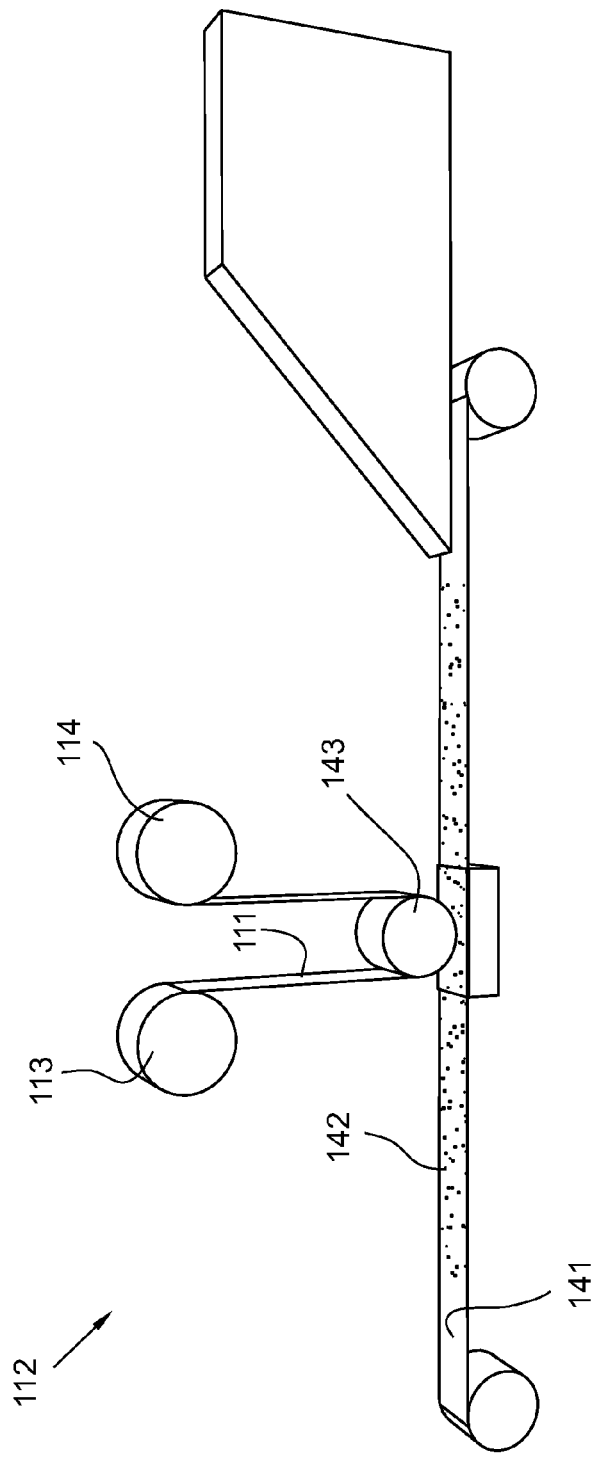
Figure 7A:
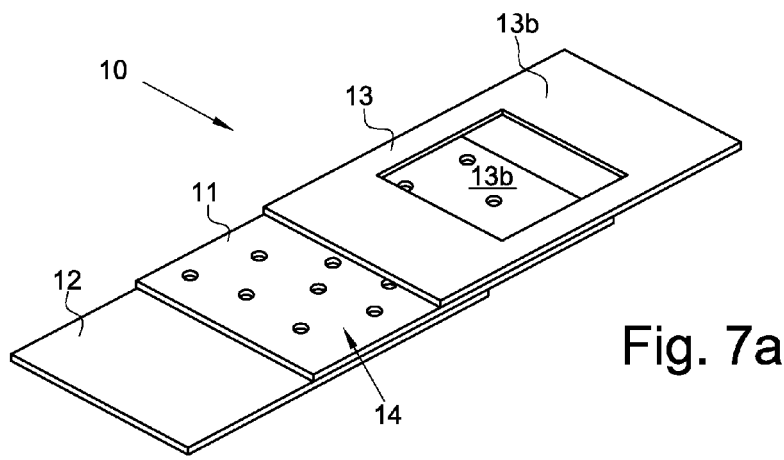
FIGS. 7a and 7b are exploded views of a first and a second example of the device for unique identification of a product comprising a code obtained through the apparatus and method according to the present invention.
Figure 7B:
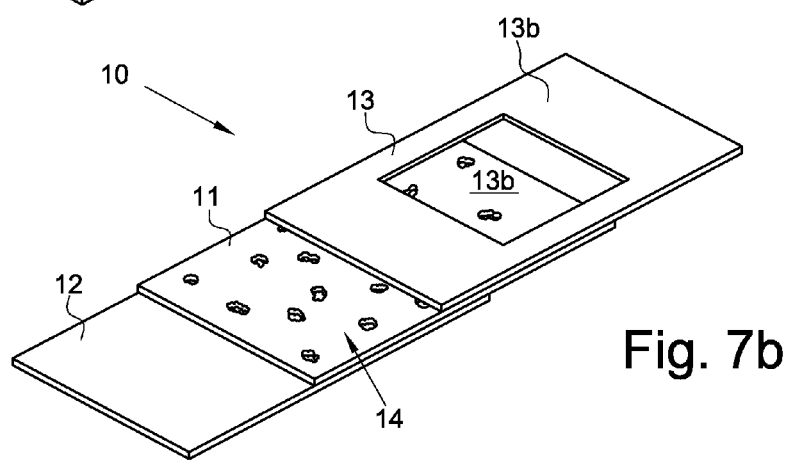

In a fourth embodiment illustrated in FIG. 6, the random drilling station 112 comprises a heated conveyor belt 141 randomly distributed on which are rigid particles 142 of any shape.

The particles 142, of any shape, are advanced on the conveyor belt towards a pressing roller 143 which compresses the strip 111 against the passage particles 142 moving it forward. The pressure of the strip against the heated particles 142 leads to the creation of holes at the particles 142, where the holes have a random distribution corresponding to the distribution of the particles 142 on the strip, as well as random shapes corresponding to the shapes of the single particles 142.

The distribution and shape of the holes thus obtained is entirely random being linked to the random and irreproducible process of distribution of the particles on the strip.

Once the strip 111 is perforated by means of the apparatus 110 for obtaining a random code useable in a device 10 for unique identification of a product according to the invention, it is subsequently cut at a suitable cutting station not illustrated, in such a manner to form a first layer 11 bearing a code 14 formed by the entirety of created holes.

Thus, such code 14 has a distribution of the holes and a configuration of the same that the known apparatus are capable of reproducing only approximately through a sampling of the original thus obtaining a copy which is always distinguishable from the original.

Such first layer 11 is subsequently coupled to a second layer 12 capable of providing an action of optical contrast.

Thus created is a device 10 for unique identification of a product substantially impossible to clone in a manner indistinguishable from the original.

Preferably, the first layer 11 is also covered through a third layer 13 for protecting and selecting a portion of the code 14 present on such first layer 11.

The second layer 12, suitable to provide an action of optical contrast, increases the accuracy of detecting the code 14 when memorizing or verifying the same.

In order to guarantee the contrast action, the second layer 12 is arranged at the lower part with respect to the first layer 11, in such a manner that the surface of the second layer 12 is visible through the holes forming the code 14 present on the first layer 11.

The optical contrast may be obtained through two different types, diversified according to the optical perceptibility of the human eye: the chromatic contrast or achromatic contrast.

Exploited in case of chromatic contrast are chromatic contrasts sensitive to human eye. The human eye perceives a coloured body when the surface thereof reflects the light incident with waves characterized by a wavelength comprised between about 400 nm and 800 nm.

Therefore, exploited in case of chromatic contrast is the contrast between two different colours, i.e. by two different wavelengths reflected by the surfaces of the first 11 and second layer when subjected to light having wavelengths comprised between 400 nm and 800 nm. In such case, the source of light may be natural light, while the detector is the human eye.

Figure 8A:
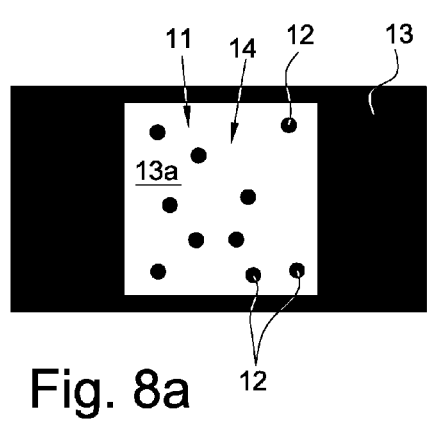
Figure 8B:
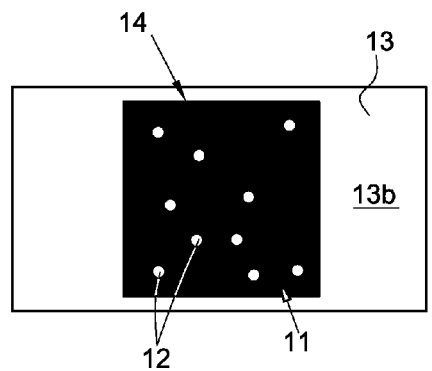

Comprised within the chromatic contrast, as extreme cases, are contrasts generated by black on white or by white on black as illustrated in FIGS. 8a and 8b.

Exploited in case of achromatic contrast instead, are two surfaces chromatically identical or similar to the visible light, which, irradiated from non-visible light, either emit visible radiations having different colour, for example in case of use of fluorescent colouring agents radiated by ultraviolet light, or radiations not belonging to the visible spectrum but perceptible by a suitable detector.

In particular, in case of chromatic contrast, the contrast layer 12 may be obtained directly by the product to be marked.

Otherwise, the second lower layer 12 has the additional task of ensuring adhesion between the identification device 10 and the product it should mark, and simultaneously ensure the durability of the code provided for during the design step.

For such purpose, the second layer 12 is made up of material capable of guaranteeing perfect adhesion between the device 10 and the product, in such a manner to ensure firm connection even under environmental conditions (temperature and humidity) beyond standard values with a preset safety margin, and having chemical/physical characteristics capable of resisting against the combined action of temperature, humidity and abrasion.

Among the materials most suitable for such applications are some polymers such as polytetrafluoroethylene (Teflon) and polyethylene.

The first layer 11 having the code 14 is also made of polymer material capable of offering capacity of perfect adhesion to the product to be marked or to the second layer 12 and a possible third layer 13 arranged at the upper part with respect to the same, and resistance, within a given safety margin, under harsh hygrothermal and mechanical conditions. Such characteristics are always observed in the same polymers mentioned previously.

Alternatively, the first layer 11 is advantageously made of polyester, given that such material is particularly resistant in case of washing, for example if the device 10 for unique identification of a product is used in the clothes industry.

Preferably, the device 10 for unique identification of a product also comprises a third layer 13 arranged at the upper part with respect to the first layer 11 for protecting and selecting a portion of the code 14 present on such first layer 11.

For such purpose, the third layer 13 at the upper part has a first portion 13a permeable to light, for example made of transparent or semitransparent material or also by removal of material, through which it is possible to detect the code present on the first layer 11, and a second portion 13b made of material non-permeable to light, preferably frame-like, arranged around the first portion 13a permeable to light.

The third layer 13 thus defines the margins for reading the code 14, defining a clear contour between the readable portion of the code 14, in that arranged at the first portion 13a permeable to light, and the portion non-permeable to light 13b.

The use of such third layer 13 for protecting and selecting the code offers the advantage of having the code with a geometric shape and a surface layer definitely matching that of the type of the sold product.

For example were one to study an example of a code dedicated to a commercial product having a given design, such as a notebook with glossy surface, one may for example think of a code selected by a glossy frame 13b with profiled selection contour according to the shape desired by the producer or designer, for example the contour could represent a company trademark.

Once a random and irreproducible code 14 has been generated on the first layer 11, and once the latter has been assembled at least on the second contrast layer 12, there occurs the reading and storage of the product code 14.

For such purpose, it is possible to use a digital image detector, such as for example a video camera or digital camera, having a resolution sufficient to guarantee the required acquisition precision.

The required resolution depends on the size of the holes with which the code is created. For example if the code is made up of 1 mm holes, a 640×480 pixels resolution is sufficient, i.e. the resolution generally available in cameras cellular phone devices are provided with. Otherwise, if the holes have dimensions equivalent to 0.5 mm, the minimum resolution must be at least equivalent to 1280×1024 pixels.

Such acquisition precision is however increased by the presence of the second contrast layer 12 which allows a more precise identification of holes forming the random code 14.

The model of the code 14 is memorised in local memory means, for example contained in a palmtop, or centralised, access to which is possible through wireless connections or through the internet, depending on the particular application requirements.

In order to verify the code it is necessary to detect the image of the code 14 again, for example through a cellular phone provided with a camera, and transmit such image to the local or remote archive in order to be able to compare with the original image.

The transmission of the image acquired using a cellular phone may for example occur by sending an MMS (Multimedia Messaging Service).

Otherwise, any data transmission means may be suitable for sending such image.

Thus, the transmitted image is processed through the same processing means with the aim of identifying a digital model bearing the positioning and shape of the holes present in the detected code.

Subsequently, there occurs the comparison between the processed digital model and the digital models memorised in the memory means when creating the identification devices 10, in order to find correspondence therebetween.

In case of lack of correspondence, the code 14 is thus identified as a counterfeit product.

Thus, there is an extremely simplified logistic management of the codes with the aim of identifying possible reproductions bearing non-memorised codes.

In case the codes correspond, should one want to verify the authenticity of a device 10 for unique identification of a product, analysis by means of microscope with sufficient magnification allows distinguishing the holes obtained through the random drilling station 112 from holes reproduced by means of apparatus used nowadays. As a matter of fact, the latter are solely capable of reproducing an approximation of the original shapes and positions created by means of entirely random and deterministically irreproducible processes.

The description outlined above clearly shows the characteristics and advantages of the apparatus and the method subject of the present invention.

The reliability of a device for unique identification of a product is given by the irreproducibility of the code borne by the same. The apparatus and the method for obtaining a random code useable in a device for unique identification of a product according to the present invention are capable of generating a code made up of a plurality of holes which are distributed and shaped in such a manner that the apparatus used nowadays for obtaining and cloning codes are capable of solely approximately reproducing through a sampling of the original, thus obtaining a copy always distinguishable from the original.

Lastly, it is clear that the apparatus and the method thus conceived are susceptible to various modifications and variants, all falling within the invention; in addition, all details may be replaced by technically equivalent elements. In practice, the materials used, as well as the dimensions, may vary depending on the technical requirements.

The invention claimed is:

1. An apparatus for obtaining a random code useable in a device for unique identification of a product, comprising:
   a sliding path of a continuous strip; and
   at least one drilling station arranged along the sliding path for obtaining a plurality of randomly distributed hole on said continuous strip, said plurality of holes forming said random code;
   wherein said drilling station has at least one means for generating a static electrical discharge randomly towards said continuous strip such that said static electrical discharge forms the holes according to a random and deterministically irreproducible process.

2. The apparatus for obtaining a random code according to claim 1, wherein said at least one means for generating the static electrical discharge towards the continuous strip passing by the drilling station, comprises at least one metal sphere supported, suspended and facing a metal support on which is said continuous strip and said metal support with said at least one metal sphere and said metal support being a difference of potential for generating the static electrical discharge between said at least one metal sphere and said metal support.

3. The apparatus for obtaining a random code according to claim 2, wherein said metal support is connected to earth, said at least one metal sphere being connected to a source of voltage through a driving circuit suitable to impart to said at least one metal sphere a voltage wave with peak values sufficient to generate static electrical discharges.

4. The apparatus for obtaining a random code according to claim 2, wherein said at least one metal sphere is moveable on a surface parallel to said metal support.

5. The apparatus for obtaining a random code according to claim 4, wherein said metal sphere is pivotally supported around a rotation axis by means of a connection rod rotated by an actuator.

6. The apparatus for obtaining a random code according to claim 2, wherein said metal support is adjustable moving away from and nearing towards said at least one metal sphere.

7. A method for obtaining a random code useable in a device for unique identification of a product the method comprising the steps step that consists of:
   generating a plurality of holes in a continuous strip according to a random and deterministically irreproducible process, said plurality of holes forming said random code,
   wherein said step of generating said plurality of holes in said continuous strip generates static electrical discharges randomly directed towards said continuous strip and randomly distributes said static electrical discharges by said random and deterministically irreproducible process which defines random discharge trajectories of said static electrical discharges.

8. A device for unique identification of a product, the device comprising:
   at least one first layer having a first side, a second side and a random code, which is obtained through the method of claim 7; and
   at least one second layer arranged at the first side of said first layer, capable of providing an optical contrast with said first layer which improves visibility of said random code obtained on said first layer.

9. The device for unique identification of a product according to claim 8, wherein said optical contrast is chromatic, and said first and second layer reflect different wavelengths when irradiated from visible light.

10. The device for unique identification of a product according to claim 8, wherein said optical contrast is achromatic, and said first and second layer emit radiations of different wavelengths when irradiated from non-visible light.

11. The device for unique identification of a product according to claim 8, further comprising a third layer arranged at the second side of said first layer for protecting and selecting a portion of said random code present on said first layer, said third layer having a first portion permeable to light such that said random code present on said first layer can be detected, and a second portion, which is made of material non-permeable to light, is arranged around said first portion permeable to light.

12. A method for obtaining a random code useable in a device for unique identification of a product, the method comprising the steps of:
   generating a plurality of holes in a continuous strip according to a random and deterministically irreproducible process, said plurality of holes forming said random code,
   wherein said step of generating a plurality of holes in said continuous strip consists of:
   randomly distributing a plurality of random rigid particles on a conveyor belt;
   heating said random particles; and
   compressing said continuous strip against said plurality of heated rigid particles in such a manner to generate a plurality of holes at contact positions between said continuous strip and said rigid particles with said random and deterministically irreproducible process randomly distributing said random rigid particles.

* * * * *